(12) United States Patent
Subramanian et al.

(10) Patent No.: US 9,253,036 B2
(45) Date of Patent: *Feb. 2, 2016

(54) METHOD AND APPARATUS FOR PROVISIONING A NETWORK SWITCH PORT

(71) Applicant: Force10 Networks, Inc., San Jose, CA (US)

(72) Inventors: Krishnamurthy Subramanian, Mountain View, CA (US); Wanqun Bao, San Jose, CA (US); Shivakumar Sundaram, Tamil Nadu (IN); Ravikumar Sivasankar, Tamil Nadu (IN); Avinash Natarajan, Tamil Nadu (IN); Pathangi Narasimhan Janardhanan, Tamil Nadu (IN)

(73) Assignee: Dell Products L.P., Round Rock, TX (US)

( * ) Notice: Subject to any disclaimer, the term of this patent is extended or adjusted under 35 U.S.C. 154(b) by 128 days.

This patent is subject to a terminal disclaimer.

(21) Appl. No.: 13/908,643

(22) Filed: Jun. 3, 2013

(65) Prior Publication Data

US 2013/0272165 A1 Oct. 17, 2013

Related U.S. Application Data

(63) Continuation of application No. 13/021,722, filed on Feb. 5, 2011, now Pat. No. 8,462,666.

(51) Int. Cl.
*H04L 12/24* (2006.01)
*H04L 12/46* (2006.01)

(52) U.S. Cl.
CPC ........ *H04L 41/0806* (2013.01); *H04L 12/4641* (2013.01)

(58) Field of Classification Search
None
See application file for complete search history.

(56) References Cited

U.S. PATENT DOCUMENTS

| | | | |
|---|---|---|---|
| 6,111,874 A | 8/2000 | Kerstein | |
| 6,934,286 B2 | 8/2005 | Hwa et al. | |
| 7,385,973 B1 | 6/2008 | Johnson et al. | |
| 7,512,078 B2 | 3/2009 | Swain et al. | |
| 7,620,043 B2 | 11/2009 | Wang et al. | |
| 7,653,063 B2 | 1/2010 | Ertemalp | |
| 7,693,144 B2 | 4/2010 | De Heer | |
| 7,920,548 B2 | 4/2011 | Lor et al. | |
| 7,920,567 B2 | 4/2011 | Seto et al. | |
| 7,933,268 B1 | 4/2011 | Melman et al. | |
| 7,965,709 B2 | 6/2011 | Du | |
| 7,983,257 B2 | 7/2011 | Chavan et al. | |
| 8,085,790 B2 | 12/2011 | Klessig et al. | |
| 8,194,674 B1 * | 6/2012 | Pagel et al. | 370/393 |
| 2006/0045089 A1 | 3/2006 | Bacher et al. | |

(Continued)

*Primary Examiner* — Hicham Foud
(74) *Attorney, Agent, or Firm* — Haynes and Boone, LLP (57) ABSTRACT

A port provision system includes a packet network device having a plurality of ports. A port provisioning system is coupled to the packet network device. The port provisioning system obtains configuration information from a host device coupled to the packet network device. The configuration information includes a virtual network identification assigned to a virtual machine included on the host device. The port provisioning system then retrieves packet information from a packet sent form the host device. The port provisioning system then provisions at least one of the plurality of ports with the virtual network identification included in the configuration information in response to determining that the packet information matches the configuration information.

20 Claims, 8 Drawing Sheets

(56) References Cited

U.S. PATENT DOCUMENTS

| | | |
|---|---|---|
| 2006/0187853 A1 | 8/2006 | Mititelu |
| 2006/0221950 A1 | 10/2006 | Heer |
| 2006/0251065 A1 | 11/2006 | Hamamoto et al. |
| 2007/0097972 A1 | 5/2007 | Jain et al. |
| 2007/0211626 A1 | 9/2007 | Gooch et al. |
| 2007/0268917 A1 | 11/2007 | Wong et al. |
| 2008/0155094 A1 | 6/2008 | Roese et al. |
| 2009/0207756 A1 | 8/2009 | Sakai et al. |
| 2009/0219830 A1 | 9/2009 | Venner et al. |
| 2011/0026527 A1 | 2/2011 | Shao et al. |
| 2011/0035474 A1 | 2/2011 | Elzur et al. |
| 2011/0064086 A1 | 3/2011 | Xiong et al. |
| 2011/0075667 A1 | 3/2011 | Li et al. |
| 2011/0090911 A1 | 4/2011 | Hao et al. |
| 2011/0222439 A1 | 9/2011 | Long |
| 2012/0014386 A1* | 1/2012 | Xiong et al. .................. 370/392 |
| 2012/0063363 A1 | 3/2012 | Li et al. |

* cited by examiner

FIG. 1 NETWORK 10

METHOD AND APPARATUS FOR PROVISIONING A NETWORK SWITCH PORT

CROSS REFERENCE TO RELATED APPLICATION

The present application claims priority to and is a continuation of co-owned, U.S. patent application Ser. No. 13/021,722, now U.S. Pat. No. 8,462,66, filed Feb. 5, 2011, the disclosure of which is incorporated herein by reference.

BACKGROUND

1. Field of the Invention

The present disclosure relates generally to packet network devices such as switches, and more particularly to methods for configuring ports on a switch to receive packets transmitted over a virtual LAN by a network host connected to the switch.

2. Description of Related Art

In traditional data center environments, where two or more network host devices, such as servers, can be aggregated by a Top of the Rack (TOR) switch, virtual LAN, (VLAN) membership information associated with traffic originating or destined to different applications from a network host, or from a virtual machine in a network host, is typically provisioned manually on the TOR switch by the network administrator. If the switch is not explicitly provisioned to receive traffic associated with a particular VLAN identity, then the switch would not forward the traffic to its destination and the traffic is simply dropped at the switch. Each physical interface or port on a TOR switch that is directly connected to a network host is manually configured to receive traffic associated with a particular VLAN based on the applications that are included on a network host device.

Data centers can include many TOR switches each one of which can be connected to forty or more network host devices, and each of the network host devices may be able to support one hundred twenty eight or more virtual machines, each one of which can be responsible for running a different application or service. In the case that two or more virtual machines are responsible for running an application or service, the traffic to and from this grouping of virtual machines can be assigned to a particular VLAN (VLAN identity). As can be imagined, such a LAN topology can be configured to support a large number of VLANs, each one of which needs to be configured on a packet network device connected to the host devices associated with the various VLAN identities. Typically, a system administrator is responsible for setting up an application or service on one or more network host devices, and a network administrator is typically responsible for ensuring that the switches that operate to process the host traffic are configured to support this traffic. Using this management model, the system administrator needs to accurately convey to the network administrator the identities of VLANs and their associations with host devices or with the virtual machines running on the host devices. Then the system administrator uses the system configuration information to provision the network switches to support the traffic to and from the host devices. This sort of manual process can easily lead to errors in configuring both the host devices and the network switches.

In light of the problems associated with manually configuring and provisioning network host and switch devices, there is significant motivation to provide for an automatic process to perform this procedure.

SUMMARY

It was discovered that a network switch can be configured with functionality that permits it to discover configuration information associated with one or more network host devices to which it is connected, and use this host device configuration information to automatically provision its ports to process traffic assigned to particular virtual LANs going to or coming from the host devices. In one embodiment, a method for provisioning at least one port on a packet network device with a VLAN ID is comprised of the packet network device establishing a communication session with a hypervisor associated with a network host device and discovering host configuration information maintained by the hypervisor which it uses to identify and store a pair of data object attributes; the packet network device is configured to trap at least one packet that ingresses to the device and to identify network source information included in the packet, it is configured to compare the network source information to the pair of data object attributes, and if there is a match between each of the attributes in the attribute pair and the source information included in the trapped packet, the packet network device provisions the port with the VLAN ID.

BRIEF DESCRIPTION OF THE DRAWINGS

The present invention can be best understood by reading the specification with reference to the following figures, in which.

DETAILED DESCRIPTION

With the advent of network host device virtualization and virtual host sprawl, it is becoming important for vendors to provide tools and processes for automating data center operations such as configuring ports on network switches connected to the network hosts to handle traffic from the virtual machines running on host devices. It is essential that these automatic configuration tools react to the dynamics of virtual machine deployment and migration in a timely fashion.

Figure 1:
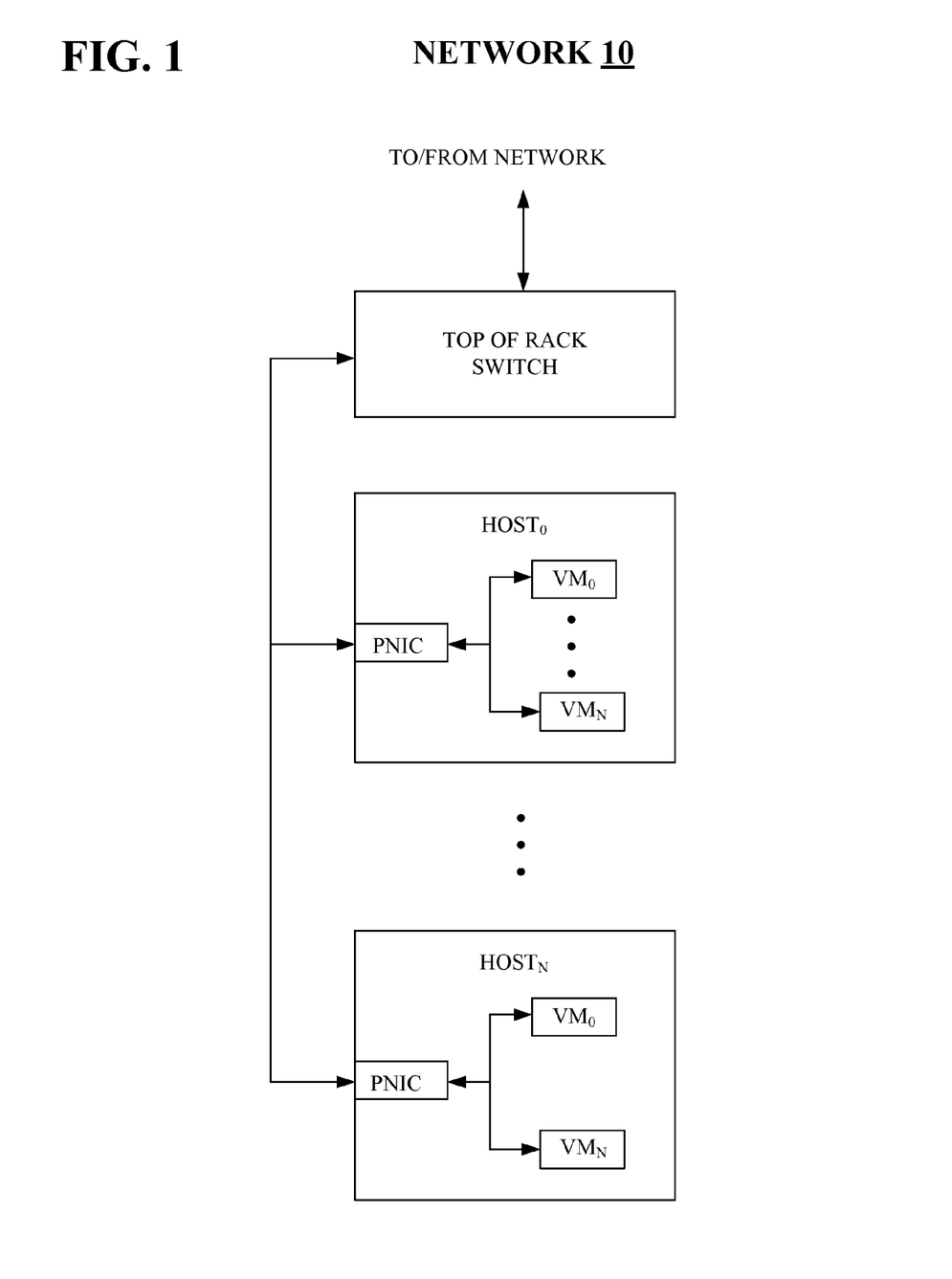
FIG. 1: High level diagram of network 10.

FIG. 1 is a diagram showing a local area network (LAN) 10 comprised of a single top of the rack (TOR) switch connected to some number of physical network host devices, such as servers. The connectivity between the switch and the hosts can be implemented in a standard LAN wired protocol such as the Ethernet protocol, or can be implemented in any standard or proprietary protocol that supports communication between network switches and network host devices. Each of the network host devices in this case include two or more virtual machines one or more of which can be responsible for running an application or providing a service to a client device in the network (not shown).

Figure 2:
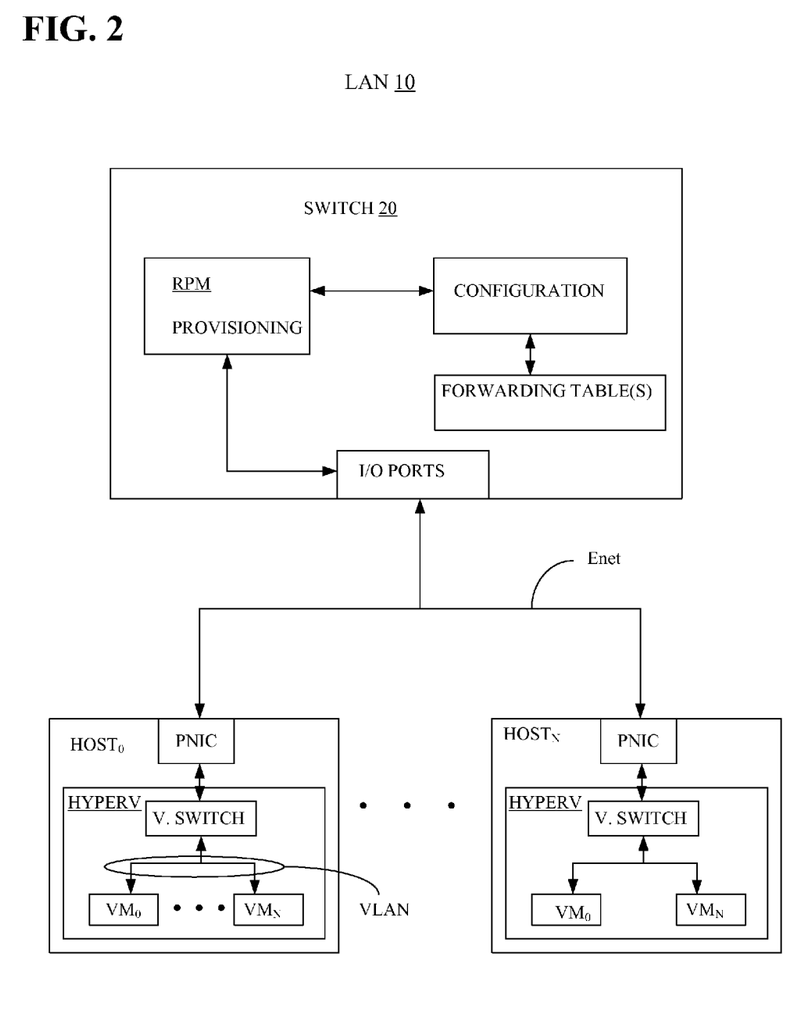
FIG. 2: Detailed diagram of network 10.

FIG. 2 is a more detailed diagram of the LAN 10 of FIG. 1 showing a network switch 20 connected over Ethernet links to a number of network host devices, $H_0$-$H_n$. Each of the host devices include one or more physical interfaces (PNICs) to the Ethernet links. Host H.0 is shown to include a single interface which is connected to a virtual switch (vSW), and the virtual switch is in turn connected to two or more virtual machines (VMs). Although, for the purpose of this description, the Host H.0 is shown with only on physical interface and one vSW, a host device typically can include more than one PNIC and vSWs. The virtual functionality comprising each of the host devices operate under the general control of a hypervisor (HyperV.) such as vSphere (which is a hypervisor designed and sold by VMWare®, Inc.) or the Citrix Xen Hypervisor (which is an hypervisor sold by Citrix® Systems, Inc.). Among other things, the hypervisor generally operates to create VMs and to assign them to host devices, to create virtual switches and assign the virtual switches to VMs and to maintain a set of data objects in which the identity the VMs, virtual switches, VLANs and PNICs are stored as well as the interconnections (configuration) between them. As will be described later, attributes comprising the data objects can be discovered by a network device, such as a network switch, that is connected to the host device and hypervisor for the purpose of configuring the switch to receive traffic from the host.

Continuing to refer to FIG. 2, the virtual switch in host H.0 is shown to be connected to a number of VMs, $VM_0$-$VM_n$, and in this case each of the VMs in this group is assigned to a VLAN 21. Each of the other host devices, H.1 and H.2 can include essentially the same functional elements as host device H.0, and be configured in the same or different manner to have more or fewer VMs, virtual switches, physical interfaces, etc. depending upon the application run on the host and/or the service(s) provided by the host.

Figure 3:
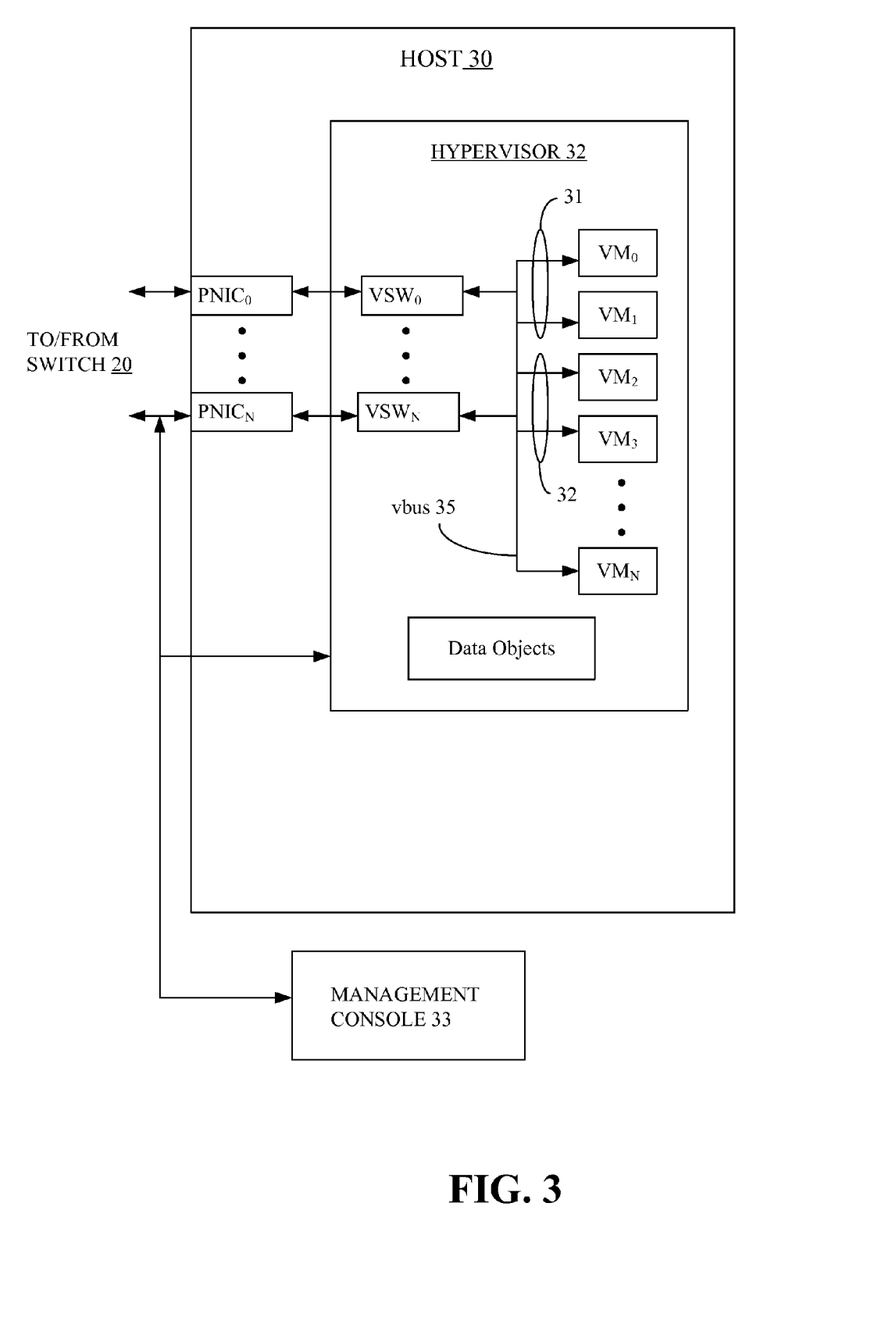
FIG. 3: Block diagram of network host device functional elements.

FIG. 3 is a more detailed diagram of a network host 30 which is similar to the network host device H.0 described with reference to FIG. 2. Host 30 is shown to include a plurality of PNICs, $PNIC_0$-$PNIC_n$ each of which are connected to a corresponding virtual switch, $VS_0$-$VS_n$, and each of the virtual switches are, in turn, connected to some number of VMs, $VIM_0$-$VM_n$ over a virtual bus 35. A hypervisor 34 operates, under the control of a management console 33, as a virtual management layer between the servers physical components and the virtual components. A detailed discussion of the operation of a hypervisor is not undertaken here, as their operation in a host environment is well understood by network engineers. The hypervisor 32 maintains a set of data objects 36 each of which is comprised of one or more attributes which include configuration information relating to the physical and virtual components running on each of the host devices. For instance, a data object "HostNetworkinfo" can include a set of attributes such as pnic, portgroup and vnic. The pnic attribute name is of type PhysicalNic[ ] which is the identity of a particular PNIC on a host device, and can be PysicalNic[1] for instance. Another data object "HostPortGroupSpec" can include a set of attributes such as policy, vlanid and vswitchName, and so forth. As with the pnic attribute type, the vlanid attribute type includes information identifying a particular VLAN that is configured on a host device such as the host 30. In FIG. 3, two VLANs are identified as VLAN-31 and VLAN-32. In this case, VLAN31 is configured on the host 30 to encompass traffic to and from virtual machines VM.0 and VM.1, and VLAN-32 is configured on the host 30 to encompass traffic to and from virtual machines VM.2 and VM.3.

Figure 4:
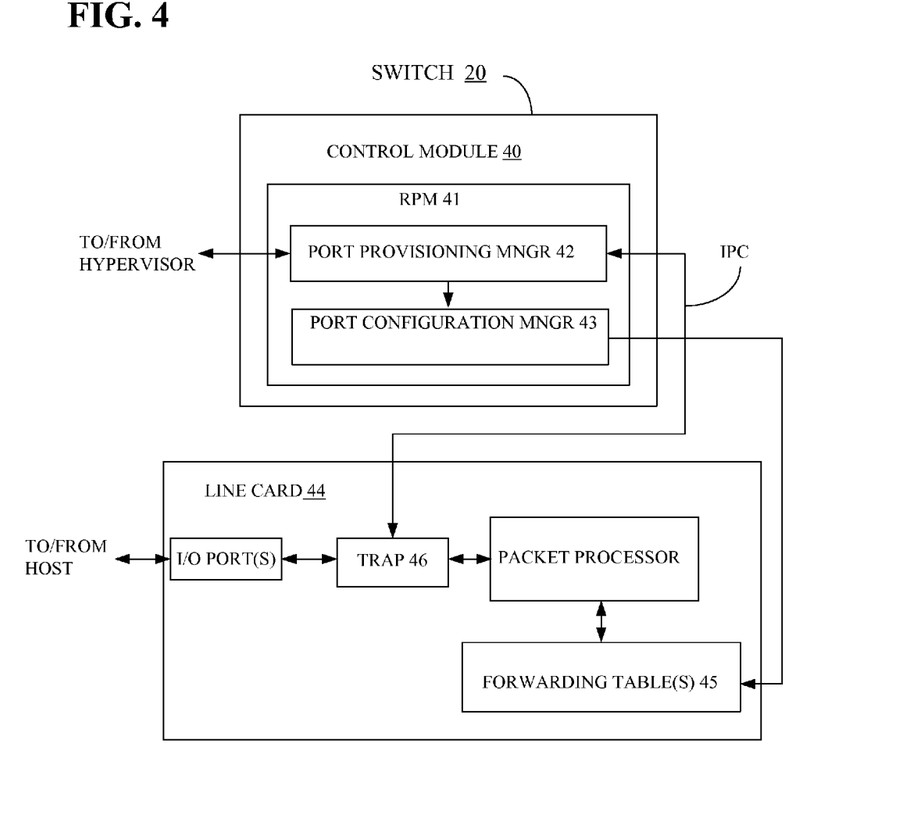
FIG. 4: Block diagram of network switch functional elements.

FIG. 4 is a diagram showing in more detail the functional elements that can be included in the switch 20 of FIG. 3. Switch 20 is shown to include a control module (CM) 40, which is generally responsible for running management plane functionality, and switch 20 is shown to include a line card (LC) 44 which is generally responsible for data plane functionality. Switch 20 can also include switch fabric modules and other functional modules, but for the purpose of this description it is not important to describe their operation. The control module 40 can include one or more route processor modules (RPM) which generally operate to run network protocols necessary for the operation of the switch 20 in the network environment in which the switch is located. In this case, a single RPM 41 is shown which generally operates to run layer-2 network protocols, and the RPM 41 in one embodiment includes a port provisioning manager 42 and a port configuration manger 43. The port provisioning manager 42 generally operates to discover data object attributes maintained by a hypervisor associated with a network host device, such as the host device 30 of FIG. 3, and to use this attribute information with information received from incoming packets transmitted by the host device 30 and copied to the provisioning manager by a trap 46 located on the LC 44 to determine how to provision ports on the switch 20. This port provisioning information is then passed to the configuration manager 43 which is responsible to entering information into a forwarding table 45 that is typically located on a line card, such as LC 44. A more detailed description of the operation of the RPM 41 is included below with reference to FIG. 5.

Figure 5:
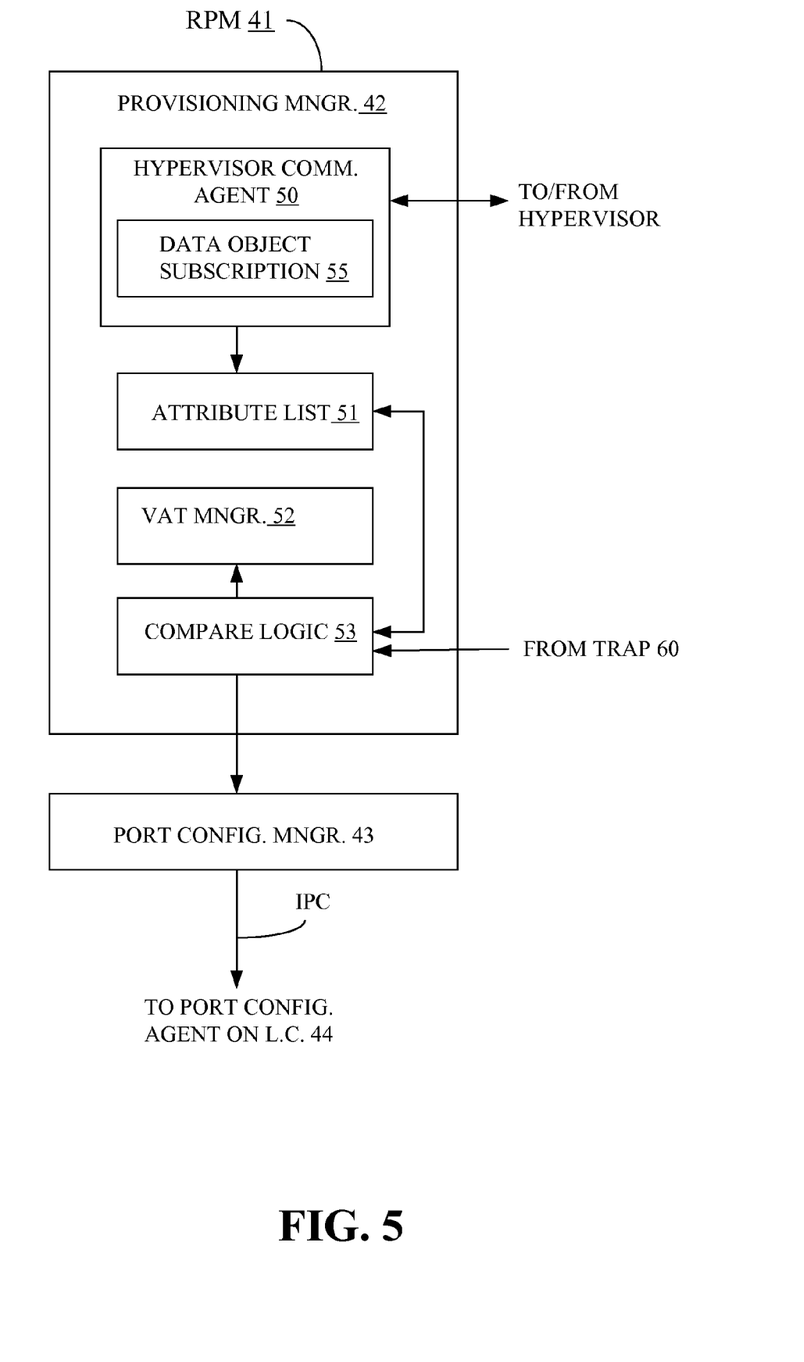
FIG. 5: Block diagram of control processor functional elements.

FIG. 5 is a more detailed diagram of the RPM 41 described with reference to FIG. 4 showing the port provisioning manager 42 and the port configuration manager 43. The port provisioning manager 42 includes an agent 50 for establishing a communication session over one or more selected ports on the network switch 30 with a hypervisor associated with a network host such as the hypervisor 32 associated with the host 30 described earlier with reference to FIG. 3. The agent 50 can employ the well known Telnet protocol, or any other suitable communication protocol for instance, to establish a session with the hypervisor. The agent 50 includes a hypervisor data object subscription function 55 that operates, upon start up of the switch 30, to register interest with the hypervisor in particular data object attributes. Subsequent to registering this interest with the hypervisor, the hypervisor can automatically send to the switch 30 any changes in the attributes subscribed to by the subscription function. Alternatively, the agent 50 can periodically request that the hypervisor sends changes in attributes of interest, but it is desirable for the switch to receive attribute changes as quickly as possible so that traffic is not dropped as the result of the switch not reconfiguring its ports in a timely manner. In one embodiment, the switch 30 can register interest with the hypervisor 32 to receive changes in configuration with respect to, among other things, the virtual machines on the network host 30 (i.e., creation of new VMs or reconfiguration of existing VM to be associated with another vSW or PNIC) any changes with respect to the configuration of the virtual switches and any changes with respect to a VLAN configuration.

Continuing to refer to FIG. 5, an attribute list 51, located in memory associated with the provisioning manager 42, stores all of the data object attribute information sent to the RPM 41 by the hypervisor 32 for use by compare logic 53 as will be described shortly. The provisioning manager also includes a VLAN assignment table manager 52 that operates to generate instructions that are stored in a VLAN assignment table (VAT) located in the LC 44, described earlier with reference to FIG. 4. In operation, the VAT table manager 52 operates on information that it receives from the compare logic 53 to generate instructions/policies that are stored in the VAT table, the operation of which is described later with reference to FIG. 6. In operation, the provisioning manager 42, subsequent to subscribing to discover certain attributes associated with the data objects managed by a host device hypervisor, periodically receives attribute change information from the hypervisor 32 and stores this attribute information in the attribute list 51. This attribute information can be in the form of a VLAN identity, the MAC address of a virtual machine or the MAC address of a PNIC, to name only three attributes. For the purpose of this discussion, it is assumed that the data object attribute information is stored in the attribute list 51 in the form of an attribute pair, with one such pair being comprised of a VMAC (address of VM) and a VLAN identity assigned to the VM. The attribute list can store one or more of these attribute pairs, and this attribute information is used by the comparison logic 53 to provision a port as described below.

With further reference to FIG. 5, the comparison logic 53 receives a copy of a packet sent to it by a trap 46 on the LC 44, which will be described later with reference to FIG. 6. The comparison logic 53 examines the packet header for information corresponding to attribute information stored in the attribute list 51, and if the comparison logic 53 determines that the packet header includes both a VMAC and VLAN ID that match information included in an attribute pair stored in the attribute table 51, then the comparison logic sends a message to a port configuration manager 42 indicating that a particular port on the switch 20 should be configured to receive traffic labeled with the VLAN ID included in the packet header.

Figure 6:
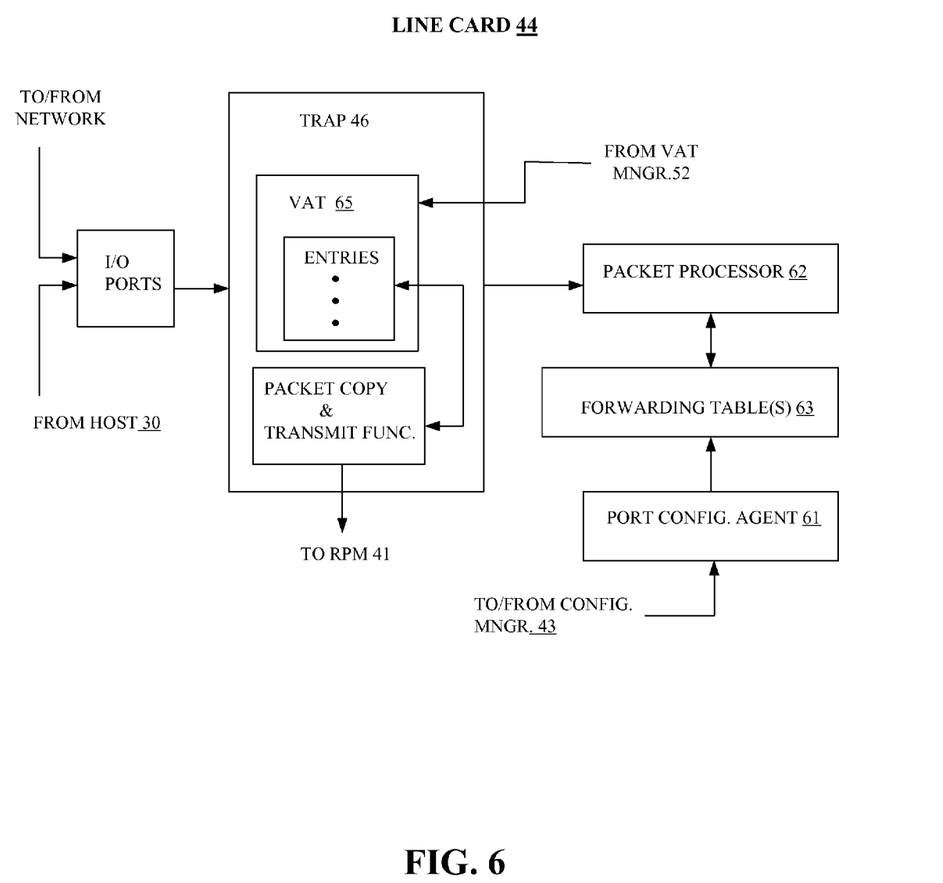
FIG. 6: Block diagram of line card functional elements.

FIG. 6 illustrates, in more detail, functionality included on the LC 44 described with reference to FIG. 4 that can be employed to implement one embodiment of the port provisioning process. Although FIG. 6 shows only one line card, more than one line card can be included in the switch 20. As shown in FIG. 6, the LC 44 can include one or more input/output ports over which network or host information can be received or transmitted respectively, a port configuration management agent 61 that operates to carry out instructions sent to it by the configuration manager 43 of FIG. 5, a trap 46 for copying information received in packets from the host device 30 of FIG. 3, a packet processor 62 that generally operates to examine the contents of packets ingressing on the switch 20 in order to determine how to forward the packets to their correct destination, and the LC 44 includes one or more forwarding/switching tables 63 which can store information used by the packet processor 62. The trap 46 can be implemented in software which can be stored in memory associated with the line card, or the trap 46 can be implemented in firmware stored in memory associated with a processing device such as a packet processing device.

Referring now to the functional elements shown in FIG. 6 in more detail, the trap 46 includes a packet copy and transmit function 64 and a packet copy policy table (referred to here as VAT table 65) for each port on the LC 44. The copy and transmit function 64 operates to examine the contents of incoming packets to identify source information, such as a virtual MAC address associated with a virtual machine (VM), a virtual LAN (VLAN) identity and/or the MAC address of a PNIC, and depending upon instructions included in the VAT table 65 entries, copies or does not copy the contents of the incoming packet, and if the contents are copied, sends this information to the RPM over an IPC link as shown in FIG. 6. When the switch 20 is first initialized, the VAT table 65 is configured with a default entry/instruction which causes the packet copy and transmit function 64 to copy all of the incoming packets and send the copies to the compare logic 53 described earlier with reference to FIG. 5. Specifically, immediately after initializing the switch 20, an first incoming packet is received by a port on the LC 44 and is sent to the packet copy and transmit function 64 in trap 46. The packet copy function 64 examines the packet header information and the default instruction in the VAT table 65 and, depending upon the contents of the VAT table instruction, copies at least a portion of the information comprising the packet header and sends this information to the compare logic 53. The default instruction in this case is an instruction to copy all packets that are received by the switch regardless of their source. Depending upon the result of the comparison operation performed by the comparison logic 53, a second, higher priority instruction (higher priority than the default instruction) can be entered into the table by the VAT table manager 52 that can be an instruction to, for instance, not copy all subsequent packets with the same source information (attribute pair information) as the first packet. Eventually, after the VAT table reaches a steady state or after the provisioning manager 42 completes discovery for a particular port, the VAT table entries are flushed and the provisioning manager waits to detect a change to the attribute list 51, at which point the VAT table manager 52 populates the VAT table with the appropriate instructions.

At the point in time that the provisioning manager 42 determines that a particular port should be configured to receive traffic associated with a particular VLAN ID, the compare logic 53 can send a message to the port configuration manager 43 which in turn instructs a port configuration agent 61 located on the LC 44 to place an entry in the forwarding/switching table 63 that associates a VLAN ID with a particular egress port on the switch 20. An embodiment of a process for automatically provisioning a port to receive traffic from a network host over a particular VLAN is now described with reference to FIG. 7A. In step one, a network switch, such as the network switch 20 described previously with respect to FIGS. 4 and 5, is initialized or rebooted and in step 2, the port provisioning manager 42 establishes a communication session with a hypervisor, such as the hypervisor 32 associated with the network host device 30 with reference to FIG. 3, and registers its interest in receiving particular attributes stored in data objects by the hypervisor. These data object attributes can include, among other things, information about the identities of one or more VLANs, virtual MAC addresses assigned to virtual machines configured on the host 30 or MAC addresses assigned to the PNICs on the host 30. In step 3, the hypervisor can automatically send attribute information of interest to the switch 20 which the switch can store in an attribute list 51 for later use. In step 4, the VAT table manager 52 in FIG. 5 can install an entry into the VAT table 65 of FIG. 6 that is a default policy with an instruction, for the packet copy and transmit function 64 of FIG. 6, to copy all packets arriving at a particular port on the switch 20 and to send the copy of the packet to the comparison logic 53 in the port provisioning manager of switch 20.

Figure 7A:
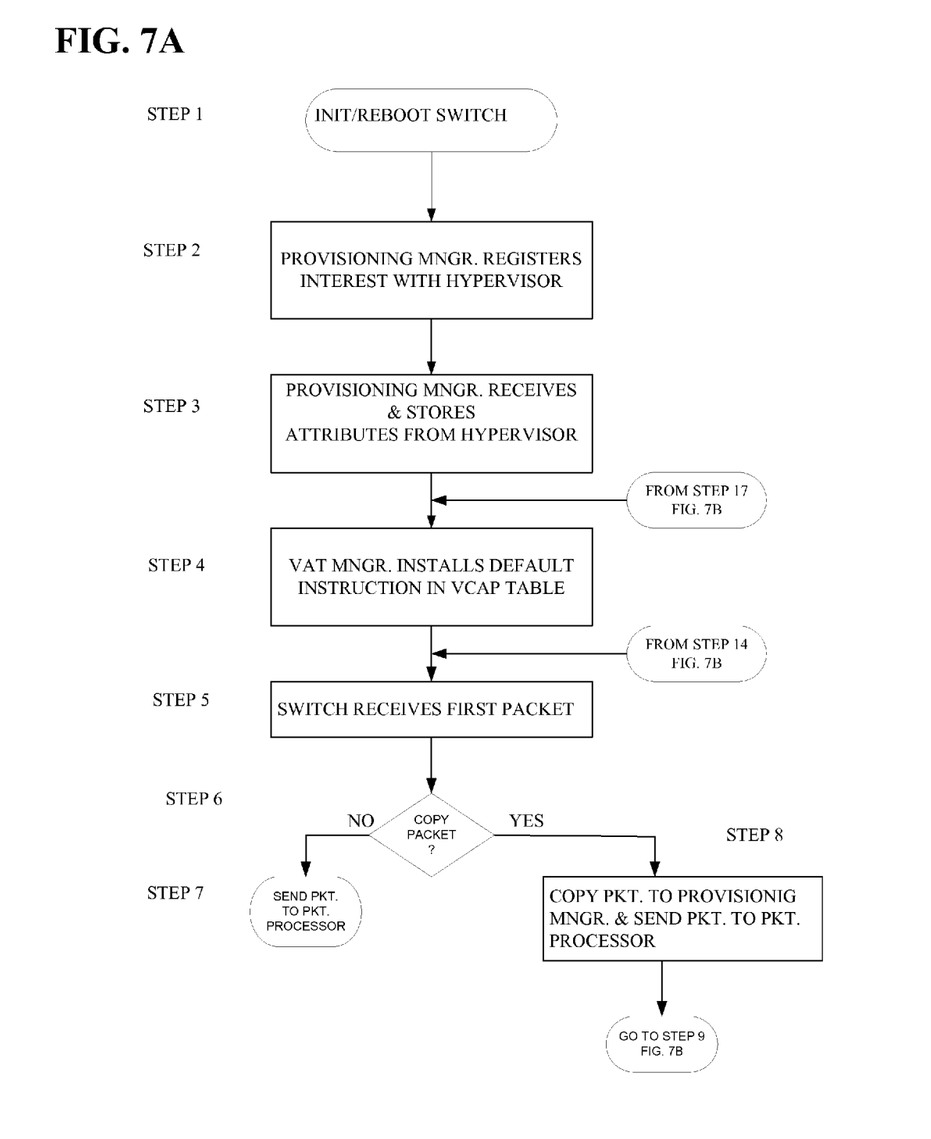
FIGS. 7A & 7B: Logical flow diagram of port provisioning process.

Continuing to refer to FIG. 7A, in step 5 the switch 20 receives a first packet from the host 30, and in step 6 the function 64 examines the highest priority policy stored in the VAT table, which in this case is the default policy (because at this point it can be the only policy), and if the policy includes an instruction to copy the packet, in step 8 the first packet is copied and sent to the comparison logic 53. If, on the other hand, the highest priority policy includes an instruction to not copy the packet, then in step 7 the packet is sent to the packet processor 62 of FIG. 6 and is processed/forwarded in the normal manner.

Figure 7B:
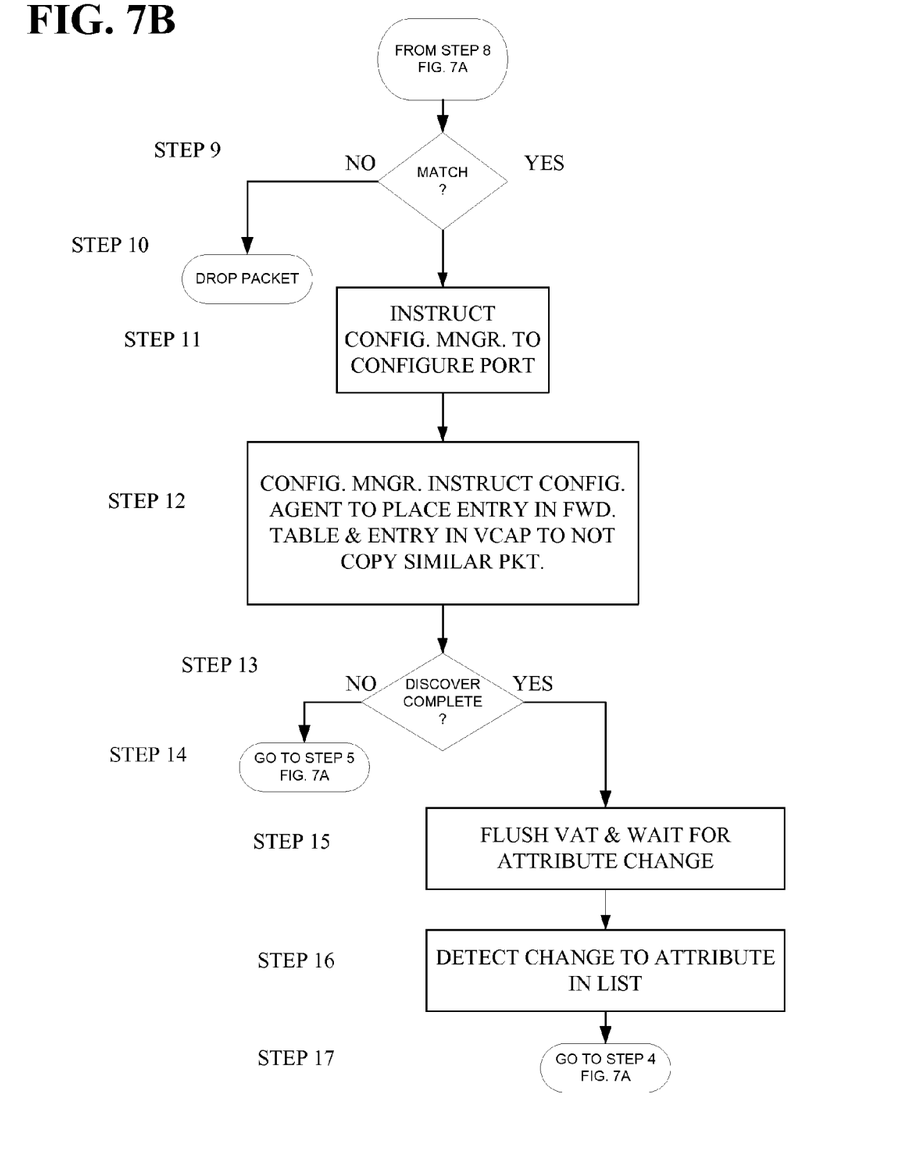

Referring now to FIG. 7B, in step 9 the comparison logic 53 examines source information included in the packet header and compares this information to information stored in the attribute list 51. So for example, if the comparison logic is programmed to compare VMAC and VLAN information identified in the packet header with information in the attribute table, and this comparison yields a match (that is the VMAC and VLAN information in the packet header and a VMAC/VLAN pair in the attribute table match), then in step 11 the compare logic sends an instruction to the port configuration manager to configure the forwarding table 63 on the LC 44 so that a packet sent to the switch 20 from the host 30 over the VLAN is forwarded. Otherwise, in step 10 the packet is dropped. Proceeding to step 12, the port configuration manager sends an instruction to the port configuration agent 61 in FIG. 6 to insert an entry into the forwarding table 63 that can include, for instance, the VMAC address and VLAN identity included in the first packet received by the switch 20 in step 5 of the process, and at the same time, the VAT table manager 52 installs an entry into the VAT table 65 in trap 46 to not copy any subsequent packets that include the same VMAC/VLAN pair.

Continuing to refer to FIG. 7B, in step 13 if the discovery process for a particular port associated with the trap 46 has not complete, then in step 14 the process returns to step 5 in FIG. 7A, otherwise the process proceeds to step 15 where the VAT table entries are flushed and the provisioning manager 42 waits to receive an attribute (this is a change to an attribute of interest) from the hypervisor. In step 16, when the port provisioning manager 42 receives an attribute from the hypervisor, in step 17 the process returns to step 4 in FIG. 7A and the provisioning manager (VAT table manager) installs a default policy into the VAT table and the process proceeds as before.

The forgoing description, for purposes of explanation, used specific nomenclature to provide a thorough understanding of the invention. However, it will be apparent to one skilled in the art that specific details are not required in order to practice the invention. Thus, the forgoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

We claim:

1. A port provision system, comprising:
a packet network device including a plurality of ports; and
a port provisioning system that is coupled to the packet network device and that is operable to:
obtain configuration information from a host device coupled to the packet network device, wherein the configuration information includes a virtual network identification assigned to a virtual machine included on the host device;
retrieve packet information from a packet sent from the host device; and
provision at least one of the plurality of ports with the virtual network identification included in the configuration information in response to determining that the packet information matches the configuration information.

2. The port provisioning system of claim 1, wherein the port provisioning system is further operable to:
register with the host device, wherein in response to registering with the host device, the port provisioning system periodically receives new configuration information that is sent automatically by the host device in response to detecting a change of at least one attribute included in previously sent configuration information.

3. The port provisioning system of claim 1, wherein the port provisioning system is further operable to:
provide periodic requests to the host device to send new configuration information if a change of at least one attribute included in previously sent configuration information has occurred.

4. The port provisioning system of claim 1, wherein the configuration information also includes at least one of an address of the virtual machine and an address of a network controller included on the host device.

5. The port provisioning system of claim 1, wherein the packet information retrieved from the packet includes first packet information copied from a first packet sent from the host device, and wherein the port provisioning system is further operable to:
prevent the retrieval of second packet information included in one or more second packets received subsequent to the first packet in response to determining that the second packet information is the same as the first packet information.

6. The port provisioning system of claim 1, wherein the packet network device includes at least one line card that includes the plurality of ports, and wherein the port provisioning system is further operable to:
provision the at least one of the plurality of ports with the virtual network identification by providing the virtual network identification in a forwarding table on the at least one line card.

7. The port provisioning system of claim 1, wherein the provisioning at least one of the plurality of ports with the virtual network identification includes configuring the at least one of the plurality of ports to receive traffic labeled with the virtual network identification.

8. An information handling system, comprising:
a plurality of servers, wherein each server includes at least one virtual machine;
a switch coupled to the plurality of servers and including a plurality of ports, wherein the switch is coupled to a port provisioning system that is operable to:
obtain configuration information from at least one of the plurality of servers, wherein the configuration information includes a virtual network identification assigned to the at least one virtual machine included on the at least one of the plurality of servers;
retrieve packet information from a packet sent from at least one of the plurality of servers; and
provision at least one of the plurality of ports with the virtual network identification included in the configuration information in response to determining that the packet information matches the configuration information.

9. The information handling system of claim 8, wherein the port provisioning system is further operable to:
register with each of the plurality of servers, wherein in response to registering with each of the plurality of servers, the port provisioning system periodically receives new configuration information that is sent automatically by each of the plurality of servers in response to detecting a change of at least one attribute included in previously sent configuration information.

10. The information handling system of claim 8, wherein the port provisioning system is further operable to:
provide periodic requests to each the plurality of servers to send new configuration information if a change of at least one attribute included in previously sent configuration information has occurred.

11. The information handling system of claim 8, wherein the configuration information also includes at least one of an address of the at least one virtual machine and an address of a network controller included on the at least one of the plurality of servers.

12. The information handling system of claim 8, wherein the packet information retrieved from the packet includes first packet information copied from a first packet sent from the at least one of the plurality of servers, and the port provisioning system is further operable to:
prevent the retrieval of second packet information included in one or more second packets received subsequent to the first packet in response to determining that the second packet information is the same as the first packet information.

13. The information handling system of claim 8, wherein the port provisioning system includes at least one line card that includes the plurality of ports, and the port provisioning system is further operable to:
provision the at least one of the plurality of ports with the virtual network identification by providing the virtual network identification in a forwarding table on the at least one line card.

14. The information handling system of claim 8, wherein the provisioning at least one of the plurality of ports with the virtual network identification includes configuring the at least one of the plurality of ports to receive traffic labeled with the virtual network identification.

15. A method for provisioning a port, comprising:
obtaining configuration information by a port provisioning system from a host device, wherein the configuration information includes a virtual network identification assigned to a virtual machine included on the host device;
retrieving packet information by the port provisioning system from a packet sent from the host device to a packet network device; and
provision, by the port provisioning system, at least one of a plurality of ports on the packet network device with the virtual network identification included in the configuration information in response to determining that the packet information matches the configuration information.

16. The method of claim 15, further comprising:
registering the port provisioning system with the host device, wherein in response to registering with the host device, the port provisioning system periodically receives new configuration information that is sent automatically by the host device in response to detecting a change of at least one attribute included in previously sent configuration information.

17. The method of claim 15, wherein the configuration information also includes at least one of an address of the virtual machine and an address of a network controller included on the host device.

18. The method of claim 15, wherein the packet information retrieved from the packet includes first packet information copied from a first packet sent from the host device, and the method further comprises:
preventing the retrieval, by the port provisioning system, of second packet information included in one or more second packets received subsequent to the first packet in response to determining that the second packet information is the same as the first packet information.

19. The method of claim 15, wherein the packet network device includes at least one line card that includes the plurality of ports, and the method further comprises:
provisioning, by the port provisioning system, the at least one of the plurality of ports with the virtual network identification by providing the virtual network identification in a forwarding table on the at least one line card.

20. The method of claim 15, wherein the provisioning at least one of the plurality of ports with the virtual network identification includes configuring, by the port provisioning system, the at least one of the plurality of ports to receive traffic labeled with the virtual network identification.

* * * * *